(12) United States Patent
Behrens et al.

(10) Patent No.: US 9,974,239 B2
(45) Date of Patent: May 22, 2018

(54) BELT THAT IS CONTINUOUSLY CLOSED IN THE LONGITUDINAL DIRECTION, IN PARTICULAR ROUND BALER BELT

(71) Applicant: ContiTech Transportbandsysteme GmbH, Hannover (DE)

(72) Inventors: Carsten Behrens, Bilshausen (DE); Lysander Stange, Northeim (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days. days.

(21) Appl. No.: 15/186,960

(22) Filed: Jun. 20, 2016

(65) Prior Publication Data
US 2017/0000036 A1  Jan. 5, 2017

(30) Foreign Application Priority Data
Jul. 3, 2015  (DE) .................. 10 2015 212 481

(51) Int. Cl.
| | | |
|---|---|---|
| *B65G 15/34* | (2006.01) | |
| *A01F 15/18* | (2006.01) | |
| *B29D 29/06* | (2006.01) | |
| *B65G 15/36* | (2006.01) | |
| *F16G 1/04* | (2006.01) | |
| *B29K 21/00* | (2006.01) | |
| *B29K 305/00* | (2006.01) | |

(52) U.S. Cl.
CPC .............. *A01F 15/18* (2013.01); *B29D 29/06* (2013.01); *B65G 15/34* (2013.01); *B65G 15/36* (2013.01); *A01F 2015/183* (2013.01); *B29K 2021/00* (2013.01); *B29K 2305/00* (2013.01); *F16G 1/04* (2013.01)

(58) Field of Classification Search
CPC ......... B65G 15/34; B65G 15/36; B65G 15/40
USPC ......................................... 198/847
See application file for complete search history.

(56) References Cited

U.S. PATENT DOCUMENTS

| | | | |
|---|---|---|---|
| 2,667,789 A | 2/1954 | Ludwing et al. | |
| 2,696,865 A * | 12/1954 | Seiler ................... | B29C 47/026 156/173 |

(Continued)

FOREIGN PATENT DOCUMENTS

DE          1176564 B          8/1964

OTHER PUBLICATIONS

EP16163788 The European Search Report dated on Aug. 1, 2016.

*Primary Examiner* — James R Bidwell
(74) *Attorney, Agent, or Firm* — David L. Cate

(57) ABSTRACT

A belt, such as a round baler belt, includes a core region, and at least one peripheral region arranged transversely to a longitudinal direction of the belt, where the peripheral region has a protective element at least sectionally, and the belt is continuously closed in the longitudinal direction. In some cases, the protective element is arranged around the entire continuously closed circumference in the longitudinal direction. The protective element may be stretched more in the longitudinal direction than the core region. The protective element may be a metal element, and in some cases, is a steel wire. Further, the protective element may be configured in an interrupted manner in the longitudinal direction. In some cases, a plurality of protective elements are arranged in a manner overlapping one another sectionally in the longitudinal direction.

16 Claims, 3 Drawing Sheets

(56) References Cited

U.S. PATENT DOCUMENTS

| | | | | |
|---|---|---|---|---|
| 3,193,425 A | * | 7/1965 | Holdsworth | B29D 29/06 156/137 |
| 3,679,044 A | * | 7/1972 | McGinnis | B29C 70/08 198/847 |
| 4,427,107 A | * | 1/1984 | Roberts | F16G 3/10 198/847 |
| 4,572,359 A | * | 2/1986 | Fujita | B65G 15/32 198/819 |
| 5,326,411 A | | 7/1994 | Arnold | |
| 5,422,165 A | | 6/1995 | Arnold | |
| 6,479,124 B1 | * | 11/2002 | Porte | B29C 70/86 264/257 |
| 6,484,872 B1 | * | 11/2002 | Jepsen | B65G 15/32 198/847 |
| 6,837,366 B2 | * | 1/2005 | Nishikita | B65G 15/36 198/847 |
| 6,986,419 B2 | * | 1/2006 | Nishikita | B65G 15/36 198/847 |
| 8,240,463 B2 | * | 8/2012 | Graber | B65G 15/34 198/819 |
| 2010/0300849 A1 | | 12/2010 | Spence et al. | |

* cited by examiner

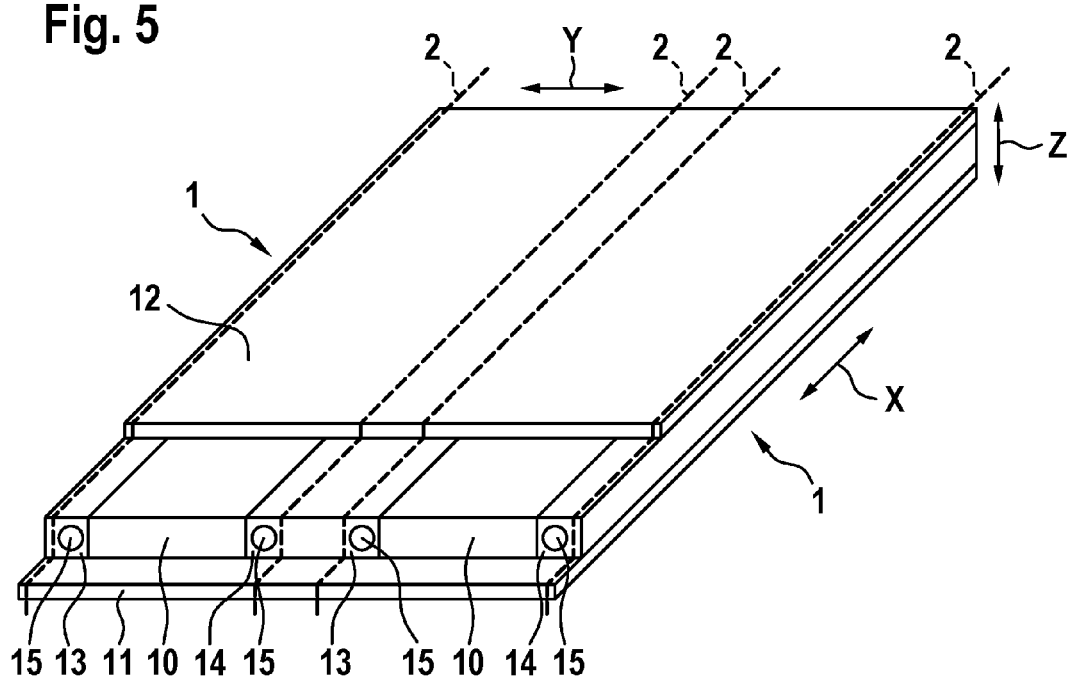
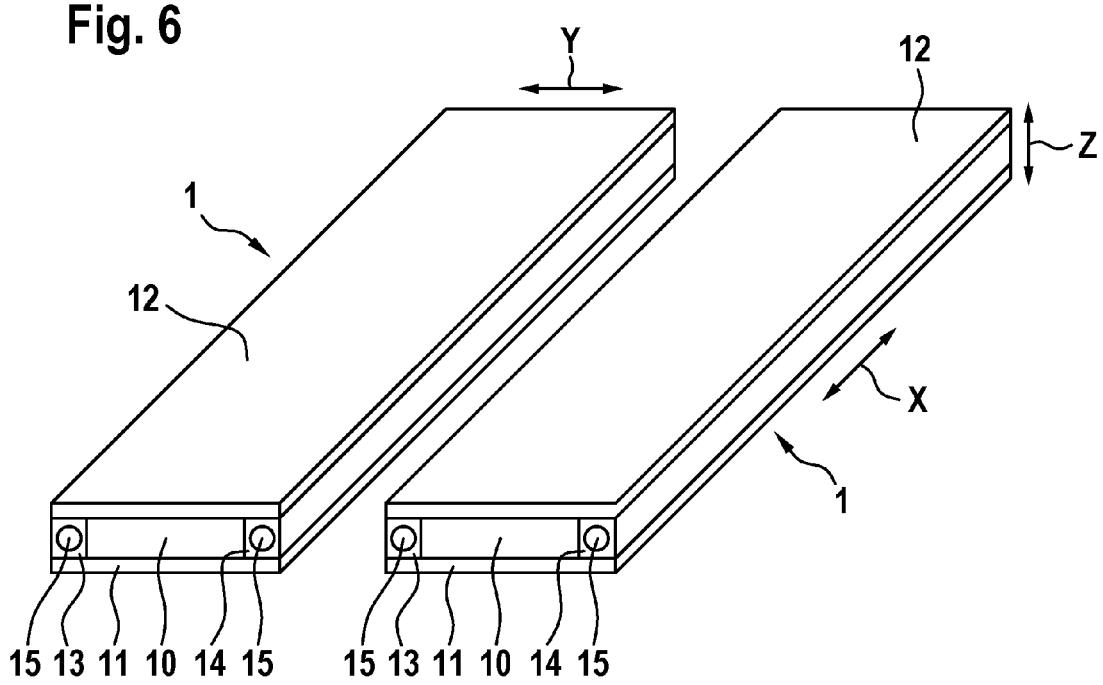

BELT THAT IS CONTINUOUSLY CLOSED IN THE LONGITUDINAL DIRECTION, IN PARTICULAR ROUND BALER BELT

CROSS REFERENCE TO RELATED APPLICATIONS

This application claims priority to German patent application number 10 2015 212 481.9, filed Jul. 3, 2015, and the entire content of this application is incorporated herein by reference.

FIELD

The disclosure relates to a belt that is continuously closed in the longitudinal direction, and in particular a round baler belt having several regions.

BACKGROUND

This section provides background information to facilitate a better understanding of the various aspects of the disclosure. It should be understood that the statements in this section of this document are to be read in this light, and not as admissions of prior art.

In many technical applications, continuously closed belts have been used for a long time. These can be for example drive belts, conveyor belts or round baler belts. These are usually produced in that a fabric carcass is manufactured as a core region from a fabric layer or a plurality of fabric layers. This core region is provided from the inside with an elastomeric running side and from the outside with an elastomeric carrying side (for example cover panel rubber). This arrangement can be cooled down freely in a press in the case of the vulcanization of rubber products. The (vulcanized) belt can then be cut to the desired width.

A disadvantage here is that, on account of the lateral cutting, the fabric of the core region is at least partially exposed and can be damaged by the cutting operation. The exposed fabric can therefore absorb moisture, with the result that undesired swelling of the fabric edges can occur, and this can lead to deformation of the belt. This can result in impaired running behaviour in the longitudinal direction. Furthermore, fabric threads of the fabric carcass can emerge laterally at the cut edges. This fraying can represent a visual defect. In addition, these frays can become entangled in other bodies and as a result be torn out of the edge of the fabric carcass, thereby causing damage to the cover panels.

DE 30 16 674 A1 discloses a baler belt for bale straps, which has a reinforcing fabric that extends in the longitudinal direction as a core. Cover panels are arranged above and below the reinforcing fabric. Edge strips are attached to both sides of the cleanly cut side edges of the baler belt, in order to cover the side edges and protect them from damage. The edge strips are usually produced from the same material as the rest of the baler belt. This is usually an elastomeric material.

A disadvantage here is that the edge strips for protecting the core region can become worn or damaged, with the result that the edge strips can carry out this task only to a limited extent or even cannot carry out this task at all.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a belt provided which includes a core region, and at least one peripheral region arranged transversely to a longitudinal direction of the belt, where the peripheral region has a protective element at least sectionally, and the belt is continuously closed in the longitudinal direction. In some cases, the protective element is arranged around the entire continuously closed circumference in the longitudinal direction. The protective element may be stretched more in the longitudinal direction than the core region. The protective element may be a metal element, and in some cases, is a steel wire. Further, the protective element may be configured in an interrupted manner in the longitudinal direction. In some cases, a plurality of protective elements are arranged in a manner overlapping one another sectionally in the longitudinal direction. In some cases, the core region is continuously wound, and may be a reinforcing fabric.

In some embodiments, the belt further includes an internal region, and an external region, and the core region is arranged between the internal region and the external region. In some aspects, the peripheral region is arranged entirely, between the internal region and the external region. The belt may further include two peripheral regions located opposite one another and transversely to the longitudinal direction.

The belt may also include an internal region and/or an external region, and wherein the internal region and/or an external region and/or the peripheral region and/or both peripheral regions comprise an elastomeric material.

Another aspect of the disclosure are methods for producing a belt which is continuously closed in the longitudinal direction, the method including producing a continuously closed core region and arranging at least one peripheral region laterally next to the core region transversely to a longitudinal direction of the belt. The peripheral region includes a protective element at least sectionally. The methods may further include arranging an internal region against the core region from the inside, where the internal region protrudes beyond the core region transversely to the longitudinal direction, and arranging an external region on the core region from the outside, where the external region protrudes beyond the core region transversely to the longitudinal direction, such that the peripheral region is arranged at least partially between the internal region and the external region. In some aspects, the peripheral region is arranged entirely between the internal region and the external region. The methods may further include vulcanizing the belt. Furthermore, the methods may further involve separating the peripheral region and/or an internal region and/or an external region in the direction of the thickness (Z) of the belt, such that the peripheral region terminates flush with the internal region and/or with the external region transversely to the longitudinal direction and encloses the protective element.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 5 shows a perspective schematic illustration of a continuously closed belt according to the disclosure in a fifth production step; and FIG. 6 shows a perspective schematic illustration of a continuously closed belt according to the disclosure in a sixth production step.

DETAILED DESCRIPTION

Figure 1:
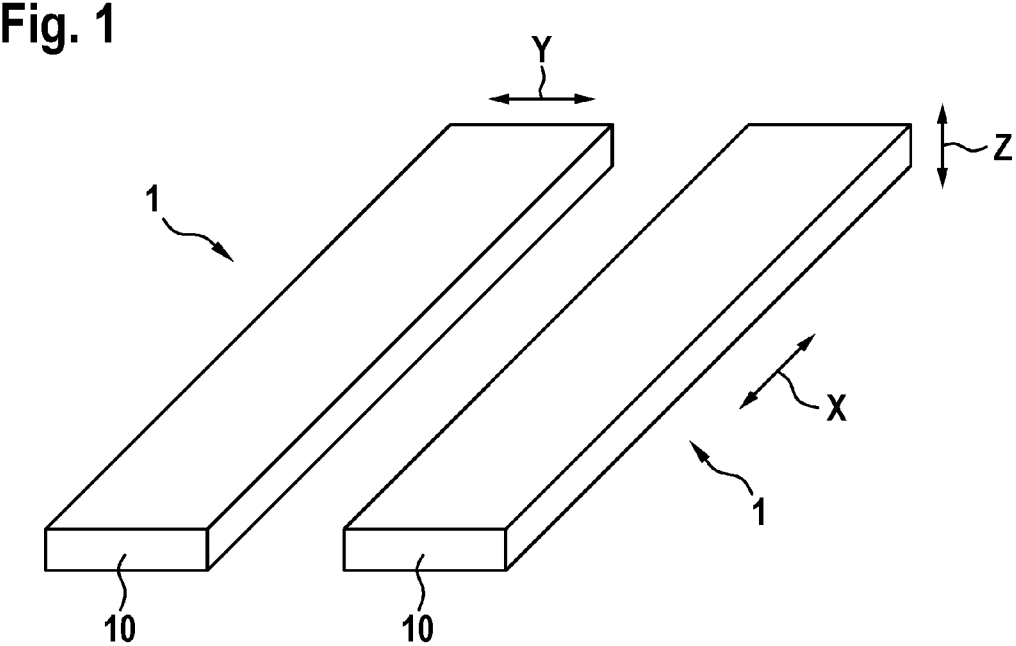
FIG. 1 shows a perspective schematic illustration of a continuously closed belt according to the disclosure in a first production step.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure.

It is an object of the embodiments according to the disclosure to provide a belt that is continuously closed in the longitudinal direction, in particular a round baler belt, of the type described at the beginning, wherein the core region can be protected laterally better than has been known hitherto.

The object may be achieved according to the disclosure by a belt that is continuously closed in the longitudinal direction, in particular a round baler belt, which is continuously closed in the longitudinal direction, and having a core region and at least one peripheral region arranged transversely to the longitudinal direction, where the peripheral region has a protective element at least sectionally. In some aspects, the belt is a round baler belt.

Furthermore, the object may be achieved according to the disclosure by a method of producing a belt that is continuously closed in the longitudinal direction by the steps of producing a continuously closed core region, and arranging at least one peripheral region laterally next to the core region and transversely to the longitudinal direction. Further, the peripheral region includes a protective element.

Thus, some embodiments according to the disclosure relate to a belt that is continuously closed in the longitudinal direction, in particular a round baler belt, having a core region and at least one peripheral region arranged transversely to the longitudinal direction, i.e. in the transverse direction. This peripheral region is arranged laterally with respect to the core region in terms of width. The core region can serve inter alia to transmit tensile forces in the longitudinal direction and can to this end have tension members.

According to embodiments of the disclosure, the peripheral region has a protective element at least sectionally. This protective element can laterally protect the peripheral region, for example from wear and/or damage. The protective element can be provided sectionally or continuously. The protective element can consist of a material which is more resilient than the rest of the material of the peripheral region. For example, the protective element can exhibit metal or consist of metal. The protective element is preferably incorporated into the material of the peripheral region, for example into an elastomeric material. In this case, this disclosure is applicable to all types of continuously closed belts, for example drive belts, conveyor belts, round baler belts etc.

According to one aspect of the disclosure, the protective element is arranged around the entire continuously closed circumference in the longitudinal direction. As a result, continuous, i.e. uninterrupted, protection can be achieved. In order to achieve this, the protective element itself can be continuously closed. It is advantageous here that it is possible, by way of the continuous closure of the protective element, to ensure that the protective effect of the protective element can be present in an uninterrupted manner. However, the protective element can also be interrupted and be arranged in an overlapping manner at the ends. It is advantageous here that the production of the protective element can be simplified in this way. In addition, the protective element can consist of a plurality, in particular of a multiplicity, of individual elements which are arranged in a manner overlapping one another. Such an arrangement can be referred to as imbricated. This plurality or multiplicity of individual elements can further simplify production and/or make it more flexible.

According to a further aspect of the disclosure, the protective element stretches more in the longitudinal direction than the core region. As a result, it is possible for the core region to continue to completely fulfill its objective of transmitting the tensile force in the longitudinal direction, because, on account of the greater stretchability of the protective element, the latter has to be able to transmit only insignificantly small tensile forces in the longitudinal direction compared with the core region as tension member. Thus, the running behaviour of the continuously closed belt can remain unaffected in spite of the protective element.

According to a further aspect of the disclosure, the protective element has a metal element, in particular a steel wire, and preferably the protective element is a metal element, in particular a steel wire. It is advantageous here that metal is a very resilient material which can have the required resilience. The use of a steel wire as the protective element is particularly advantageous because a steel wire can meet the requirement of stretching little while having simultaneously high resilience. A steel wire should be understood in this case as meaning a two-dimensional mesh of steel filaments in the form of a knit. The intermediate spaces between the steel filaments can be penetrated very readily by the material of the peripheral region, which is preferably an elastomeric material, and so the steel wire can be embedded very readily in the material of the peripheral region.

According to a further aspect of the disclosure, the protective element is configured in an interrupted manner in the longitudinal direction. As a result, the protective element can be configured in a segmented manner. Here, too, it is possible for no tensile forces to be able to be transmitted in the longitudinal direction via the protective element, because this objective is still intended to be carried out by the core region.

According to a further aspect of the disclosure, a plurality of protective elements are arranged in a manner overlapping one another sectionally in the longitudinal direction. Overlapping can take place in an imbricated manner. As a result, the protection at the overlapped points can be increased.

According to a further aspect of the disclosure, the continuously closed belt also has an internal region and an external region, the core region being arranged between the internal region and the external region, the peripheral region furthermore preferably being arranged at least sectionally, preferably entirely, between the internal region and the external region. In this case, "internal" and "external" should be understood as meaning in the direction of the thickness or height of the continuously closed belt, i.e. so to speak in the radial direction. The internal region represents the running side and the external region the carrying side in the case for example of a round baler belt.

In this way, the core region can be protected on both sides by the internal and external regions. This is the case if the internal and external regions each extend in the transverse direction only over the width of the core region and the peripheral region is configured to be so thick that it laterally adjoins the internal region, the external region and the core region.

Alternatively, the external region and the internal region can also be formed over a part of the width or the entire width of the continuously closed belt in the transverse direction, such that they partially or entirely enclose both the peripheral region and the core region between one another. As a result, a better connection can be created over a larger contact area. In addition, this contact area can enclose the peripheral region from three sides, this likewise being able to increase the stability of this connection. As a result of this improved connection between the peripheral region and the rest of the belt, the peripheral region can exert its protective action better and for longer.

If the peripheral region is arranged entirely between the internal region and the external region, then the internal region and the external region and also the peripheral region extend over the same width in the transverse direction and thus terminate laterally flush with one another. As a result, a smooth and closed surface is produced in each case upwardly and downwardly, this not only having a uniform appearance but also being able to exhibit uniform behaviour, for example with regard to the running properties. As a result of this, too, the connection between the peripheral region and core region is protected by the internal and external regions arranged thereunder and thereover, respectively. Furthermore, the action between the internal and external regions and the peripheral region can be maximized in this way in that the contact area between these regions is maximized.

According to a further aspect of the disclosure, the continuously closed belt has two peripheral regions located opposite one another transversely to the longitudinal direction. In this way, the above-described advantages of the disclosure can be used at both lateral edges of the continuously closed belt. As a result, the continuously closed belt can also be constructed in a symmetrical manner.

According to a further aspect of the disclosure, the core region is continuously wound. As a result, a continuously closed belt can be produced without interruption in the longitudinal direction, and so a connecting point as a weak point can be avoided. Uniform transmission of tensile forces in the longitudinal direction can also be allowed.

According to a further aspect of the disclosure, the core region has a reinforcing fabric. This can allow or improve the transmission of tensile forces in the longitudinal direction. The reinforcing fabric can be formed in a single-ply or multi-ply manner.

According to a further aspect of the disclosure, the internal region and/or the external region and/or a peripheral region and/or both peripheral regions exhibit an elastomeric material, preferably consist of an elastomeric material. In this way, the elastic properties of the elastomeric material can be used in the continuously closed belt.

Some embodiments of the disclosure also relate to methods for producing a belt that is continuously closed in the longitudinal direction, as described above, having the steps of:
  producing a continuously closed core region, and
  arranging at least one peripheral region laterally next to the core region transversely to the longitudinal direction, the peripheral region having a protective element at least sectionally.

By means of the methods, a continuously closed belt according to the disclosure can be produced easily and efficiently.

According to a further aspect of the disclosure, the methods also have the additional steps of:
  arranging an internal region against the core region from the inside, the internal region preferably protruding beyond the core region transversely to the longitudinal direction, and
  arranging an external region on the core region from the outside, the external region preferably protruding beyond the core region transversely to the longitudinal direction, such that the peripheral region is arranged at least partially, preferably entirely, between the internal region and the external region.

The internal region and the external region have the advantages already described above. This type of production allows good accessibility of the intermediate products for the individual method steps when the belt is constructed from the inside to the outside.

According to a further aspect of the disclosure, the methods also have the additional step of:
  vulcanizing the belt.

As a result, the above-described arrangement of the individual elements of the continuously closed belt according to the disclosure can be vulcanized jointly, such that a cohesive connection can be produced between all the elements.

According to a further aspect of the disclosure, the method also has the additional steps of:
  separating the peripheral region and/or an internal region and/or an external region in the direction of the thickness of the belt, such that the peripheral region terminates flush with the internal region and/or with the external region transversely to the longitudinal direction and encloses the protective element.

In this way, the vulcanized continuously closed belt can be cut to such a width that the internal and external regions reliably surround the core region and the peripheral region on both sides and the protective element is enclosed in the peripheral region. Furthermore, the continuously closed belt can be cut to the desired width as a result. As a result, a smooth and straight lateral edge of the continuously closed belt can also be produced. This can be advantageous for the straight running of the continuously closed belt.

FIGS. 1 to 6 show perspective schematic illustrations of a continuously closed belt 1 according to the disclosure in a first to sixth production step.

The continuously closed belt 1 is a round baler belt 1 which extends substantially in the longitudinal direction X and is continuously closed (not illustrated) in the longitudinal direction X. In the lateral direction Y or transverse direction Y, the round baler belt 1 has a particular width. The round baler belt 1 is configured in a comparatively flat manner in terms of height Z or thickness Z. The longitudinal direction X, the transverse direction Y and the height Z are each arranged perpendicularly to one another.

The round baler belt 1 has a core region 10 in the form of a reinforcing fabric 10. The reinforcing fabric 10 is arranged on a manufacturing drum in a manner wound in a continuously closed manner. At the same time, the reinforcing fabric 10 is already cut to its final width. This can take place both by simply trimming the width of a single baler belt and by cutting the width of the carcass multiple times once at the manufacturing plant prior to vulcanization (manufacturing trim). In order to be able to produce a plurality of, in this case two, round baler belts 1 simultaneously at a manufacturing plant, a plurality of continuously closed reinforcing fabrics 10 can be arranged alongside one another in the transverse direction Y (cf. FIG. 1).

Figure 2:
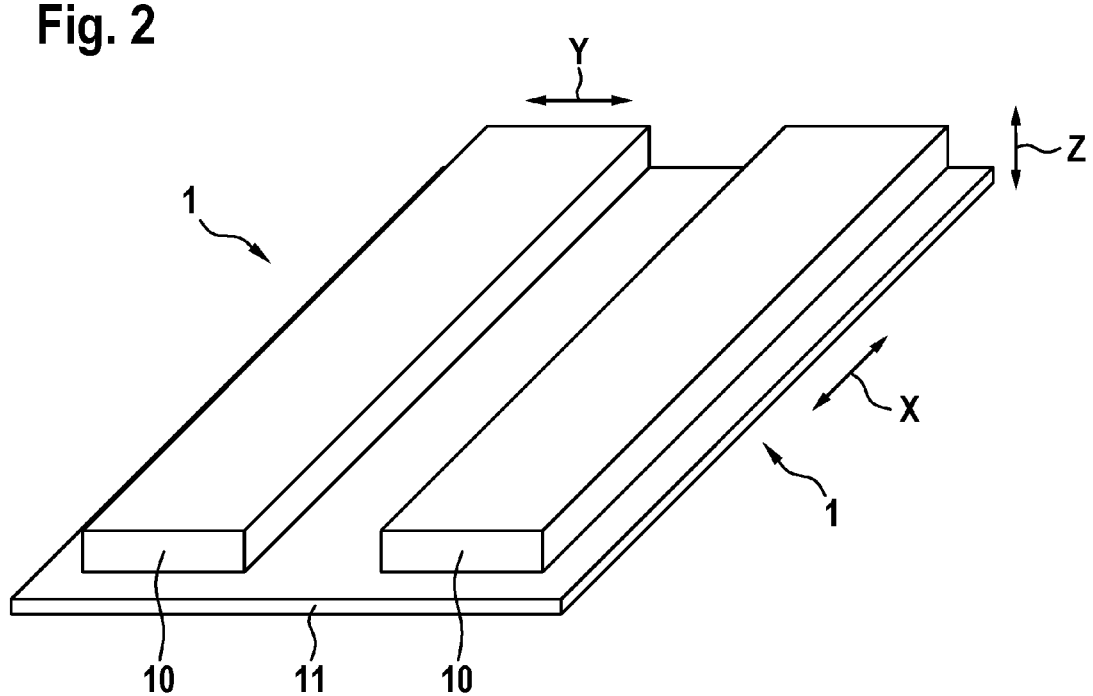
FIG. 2 shows a perspective schematic illustration of a continuously closed belt according to the disclosure in a second production step.
Figure 3:
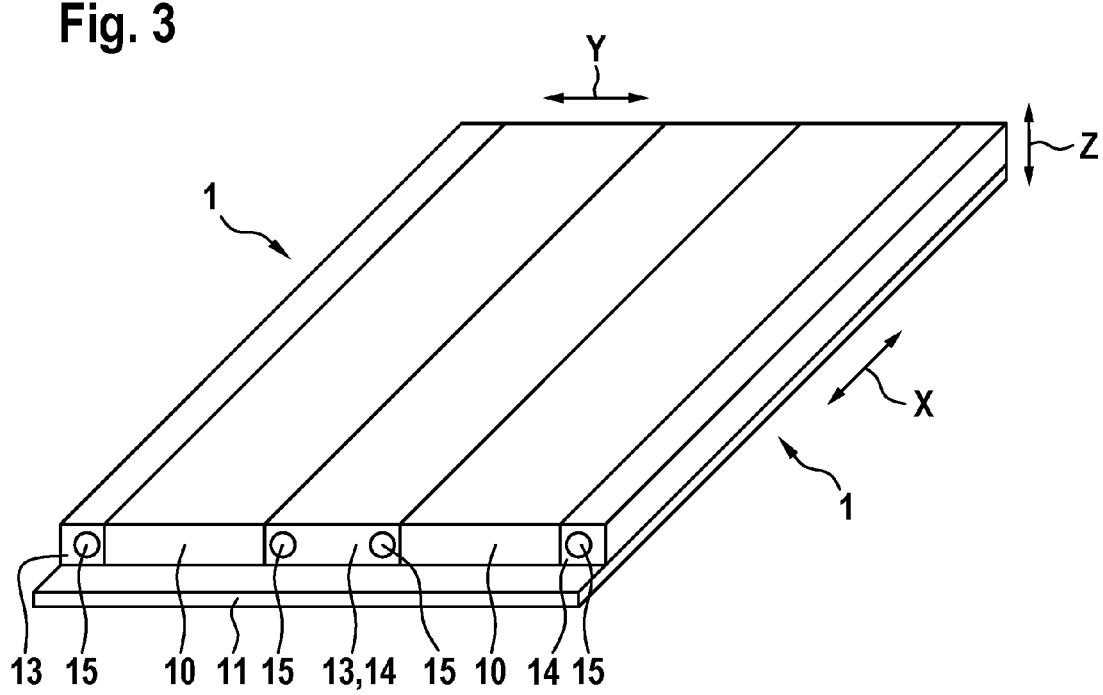
FIG. 3 shows a perspective schematic illustration of a continuously closed belt according to the disclosure in a third production step.

In a second method step, these reinforcing fabrics 10 are lined from below, i.e. from the inside, with an internal or running-side region made of elastomeric material (cf. FIG. 2). In a third method step, further elastomeric material, preferably in the form of material strips, is then applied to the upper, external side of the running-side region 11, laterally with respect to the two reinforcing fabrics 10 in the transverse direction Y, at the level of the reinforcing fabrics 10 (cf. FIG. 3). This elastomeric material forms first and second peripheral regions 13, 14 laterally with respect to the reinforcing fabrics 10.

A protective element 15 in the form of a steel wire 15 arranged around the entire continuously closed circumference of the round baler belt 1 is contained in the elastomeric material of each of the two peripheral regions 13, 14, said steel wire 15, on account of its great stretchability, being able to transmit only insignificantly small tensile forces in the longitudinal direction X compared with the core region 10 as tension member. The steel wires 15 are each penetrated by the elastomeric material of the peripheral regions 13, 14 and as a result embedded firmly in the peripheral regions 13, 14. The steel wires 15 protect the core region 10 against damage and wear laterally in the transverse direction Y.

Figure 4:
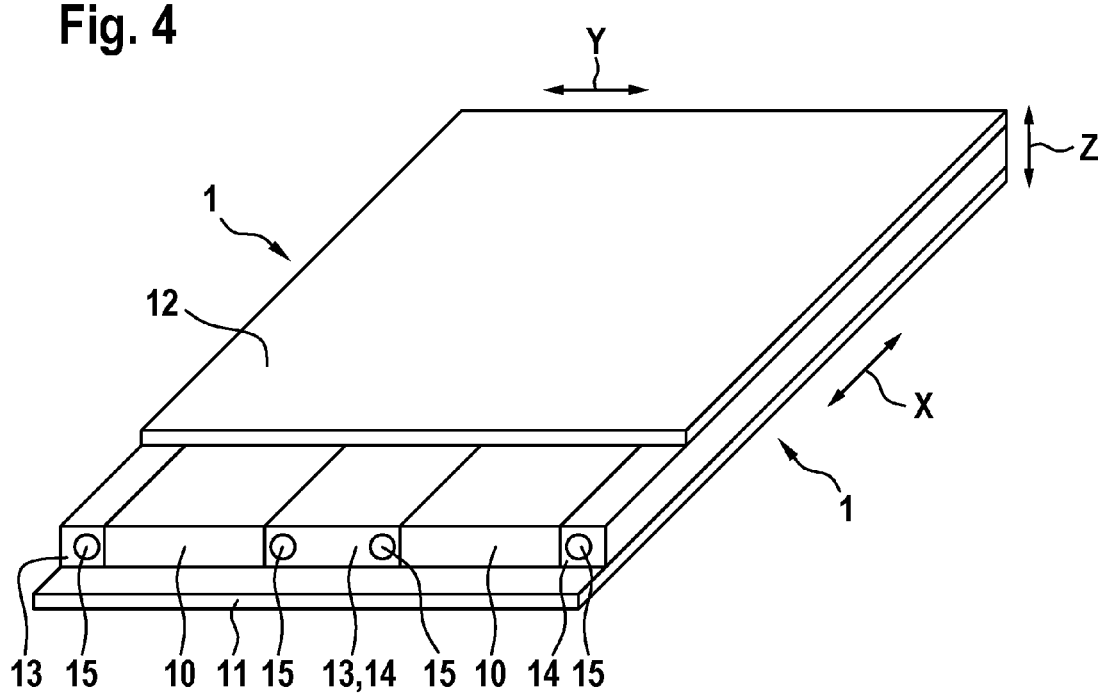
FIG. 4 shows a perspective schematic illustration of a continuously closed belt according to the disclosure in a fourth production step.

In a fourth method step, an external or carrying-side region 12 is then applied to the reinforcing fabrics 10 or peripheral regions 13, 14 from above, such that the latter are covered over the entire width in the transverse direction Y (cf. FIG. 4). This arrangement is then vulcanized.

In a fifth method step, the two reinforcing fabrics 10 can be separated from one another in that cutting is carried out in the longitudinal direction X along the cutting lines 2 (cf. FIG. 5). As a result, straight outer edges of the round baler belts 1 are created laterally in the transverse direction Y (cf. FIG. 6). In order not to damage the two reinforcing fabrics 10 during cutting, the latter can be detected nondestructively by means for example of ultrasound or X-rays and the cutting lines 2 can be marked on the outer top side of the carrying-side region 12.

In this way, the running properties of a continuously wound belt 1 in the form of a round baler belt 1 can be used according to the disclosure and at the same time the lateral edges thereof can be protected by the two elastomeric peripheral regions 13, 14 and in particular the steel wires 15 embedded there. It is also possible to avoid a situation in which the reinforcing fabric 10 can be damaged by the cutting to size and can protrude laterally out of the round baler belt 1 in the transverse direction Y. This can also improve the visual appearance of the round baler belt 1. The two elastomeric peripheral regions 13, 14 can also act as protection against wear for the lateral edges of the round baler belt 1.

LIST OF REFERENCE SIGNS (PART OF THE DESCRIPTION)

X Longitudinal direction
Y Transverse direction or lateral direction
Z Thickness or height
1 Continuously closed belt or round baler belt
2 Cutting line
10 Core region or reinforcing fabric
11 Internal or running-side region
12 External or carrying-side region
13 First peripheral region
14 Second peripheral region
15 Protective element, protection against abrasion or steel wire

We claim:

1. A belt comprising a core region, and at least one peripheral region arranged transversely to a longitudinal direction of the belt, wherein the peripheral region has a protective element at least sectionally, wherein the belt is continuously closed in the longitudinal direction; and,
wherein the protective element is a two-dimensional mesh of steel filaments in the form of a knit.

2. The belt according to claim 1, wherein the protective element is arranged around the entire continuously closed circumference in the longitudinal direction.

3. The belt according to claim 1, wherein the protective element is stretched more in the longitudinal direction than the core region.

4. The belt according to claim 1 further comprising an internal region, and an external region, wherein the core region is arranged between the internal region and the external region.

5. The belt according to claim 4, wherein the peripheral region is arranged entirely, between the internal region and the external region.

6. The belt according to claim 1 further comprising two peripheral regions located opposite one another transversely to the longitudinal direction.

7. The belt according to claim 1, wherein the core region is continuously wound.

8. The belt according to claim 1, wherein the core region is a reinforcing fabric.

9. The belt according to claim 1, further comprising an internal region and/or an external region, and wherein the internal region and/or an external region and/or the peripheral region and/or both peripheral regions comprise an elastomeric material.

10. The belt according to claim 1, wherein the belt is a round baler belt.

11. A method for producing a belt which is continuously closed in the longitudinal direction, the method comprising:
producing a continuously closed core region; and
arranging at least one peripheral region laterally next to the core region transversely to a longitudinal direction of the belt;
wherein the peripheral region comprises a protective element at least sectionally, and wherein the protective element is a two-dimensional mesh of steel filaments in the form of a knit.

12. The method according to claim 11 further comprising:
arranging an internal region against the core region from the inside, wherein the internal region protrudes beyond the core region transversely to the longitudinal direction; and
arranging an external region on the core region from the outside, wherein the external region protrudes beyond the core region transversely to the longitudinal direction, such that the peripheral region is arranged at least partially between the internal region and the external region.

13. The method according to claim 12, wherein the peripheral region is arranged entirely between the internal region and the external region.

14. The method according to claim 11 further comprising vulcanizing the belt.

15. The method according to claim 11 further comprising separating the peripheral region and/or an internal region and/or an external region in the direction of the thickness (Z) of the belt, such that the peripheral region terminates flush with the internal region and/or with the external region transversely to the longitudinal direction and encloses the protective element.

16. The method according to claim 11, wherein the belt is a round baler belt.

\* \* \* \* \*